(12) United States Patent
Korman

(10) Patent No.: US 9,418,552 B2
(45) Date of Patent: Aug. 16, 2016

(54) METHOD AND SYSTEM FOR AUTOMATICALLY LOCATING VACANT PARKING PLACES

(71) Applicant: Hi-Park Solutions Ltd., Petach Tikva (IL)

(72) Inventor: Ronen Korman, Petach Tikva (IL)

(73) Assignee: HI-PARK SOLUTIONS LTD., Petach Tikva (IL)

( * ) Notice: Subject to any disclaimer, the term of this patent is extended or adjusted under 35 U.S.C. 154(b) by 0 days.

(21) Appl. No.: 14/235,087

(22) PCT Filed: Dec. 12, 2012

(86) PCT No.: PCT/IL2012/000389
§ 371 (c)(1),
(2) Date: Jan. 27, 2014

(87) PCT Pub. No.: WO2013/088431
PCT Pub. Date: Jun. 20, 2013

(65) Prior Publication Data
US 2014/0292541 A1    Oct. 2, 2014

Related U.S. Application Data

(60) Provisional application No. 61/570,637, filed on Dec. 14, 2011.

(51) Int. Cl.
*G08B 21/00* (2006.01)
*G08G 1/14* (2006.01)

(52) U.S. Cl.
CPC ............... *G08G 1/144* (2013.01); *G08G 1/143* (2013.01)

(58) Field of Classification Search
CPC .......... G08G 1/14; G08G 1/144; G08G 1/143

USPC ................ 340/932.2; 348/118, 135, 143
See application file for complete search history.

(56) References Cited

U.S. PATENT DOCUMENTS

| | | | |
|---|---|---|---|
| 7,714,742 B1 | 5/2010 | Noworolski | |
| 8,963,740 B2 | 2/2015 | Koukoumidis | |
| 2007/0040701 A1 | 2/2007 | Browne | |
| 2007/0199076 A1 | 8/2007 | Rensin et al. | |
| 2007/0273558 A1 | 11/2007 | Smith et al. | |
| 2008/0048885 A1 | 2/2008 | Quinn | |
| 2009/0309760 A1 | 12/2009 | Chew | |
| 2010/0259420 A1* | 10/2010 | Von Reyher | B62D 15/028 340/932.2 |
| 2010/0283633 A1 | 11/2010 | Becker et al. | |
| 2011/0133957 A1 | 6/2011 | Harbach et al. | |
| 2012/0062395 A1 | 3/2012 | Sonnabend | |
| 2013/0057686 A1 | 3/2013 | Genc et al. | |

FOREIGN PATENT DOCUMENTS

| | | |
|---|---|---|
| EP | 2267681 | 12/2010 |
| WO | 2013/072105 | 5/2013 |

OTHER PUBLICATIONS

International Search Report of PCT Application No. PCT/IL2012/000389 dated Apr. 9, 2013.

* cited by examiner

*Primary Examiner* — Jeffery Hofsass
(74) *Attorney, Agent, or Firm* — Edward Langer, Adv. & Patent Attorney

(57) ABSTRACT

An Automatic-vacant-parking-place locator (AVPPL) system and method in which a community member may get (manually or automatically) information on a vacant parking place in an area he/she is searching for a parking place. Further an AVPPL community member may provide information on vacant parking place in different areas, he/she is driving through, to other AVPPL community members and/or to an AVPPL mutual database.

24 Claims, 8 Drawing Sheets

METHOD AND SYSTEM FOR AUTOMATICALLY LOCATING VACANT PARKING PLACES

CROSS-REFERENCE TO RELATED APPLICATIONS

This application is a National Phase Application of PCT International Application No. PCT/IL2012/000389, International Filing Date Dec. 12, 2012, entitled "METHOD AND SYSTEM FOR AUTOMATIC VACANT PARKING PLACE LOCATOR", published on Jun. 20, 2013 as International Publication Number WO 2013/088431, claiming priority of U.S. Patent Application No. 61/570,637, filed Dec. 12, 2011, both of which are incorporated herein by reference in their entirety.

TECHNICAL FIELD

The present disclosure relates to the field of vacant parking place locators and more particularly to automatic vacant parking locators.

BACKGROUND

An operating system (OS) is a set of programs that mange a computer's hardware resources and provides a plurality of common services for different application software.

Mobile operating system, also known as: mobile OS, mobile software platform, and/or handheld operating system are the operating systems that control a mobile device. Mobile OS are similar in principle to an operating system such as WINDOWS, MAC OS X, and/or LINUX distributions that control a desktop computer or laptop, for example.

Exemplary devices running mobile operating system: are smartphones, personal digital assistants (PDAs), tablet computers, information appliances, mobile devices, and/or wireless devices. Some of the above are part of a group of what are sometimes referred to as smart devices, which may also include embedded systems.

Exemplary Operating systems that can be found on smartphones, mobile OS powered tablet computers, and other mobile wireless devices can include: GOOGLE's ANDROID, APPLE's iOS, RIM's BLACKBERRY OS, MICROSOFT's WINDOWS phone, LINUX, HP's webOS, SAMSUNG's BADA, NOKIA's MeeGo, among many others.

Application software also known as "app" or "application" are software designed to help a user perform specific tasks. Exemplary application may be: office suits, graphic software, media players, etc.

Mobile applications are software usually designed to run on smart devices such as, but not limited to: smartphones, tablet computers, etc. Mobile applications may be available to purchase or to be free downloaded through application-distribution platforms, which are typically operated by an owner of the mobile operating system such as, but not limited to: APPLE store referred to as Apps Store, ANDROID market, etc. Mobile applications may be downloaded from the platform to a targeted device. Exemplary targeted device may be: an iPhone, a BlackBerry, etc.

An application server is a software framework that provides an environment in which applications can run, no matter what the application are or what they do. It is dedicated to the efficient execution of procedures (programs, routines, scripts, etc.) for supporting a construction of applications. Application server may act as a set of components accessible to a software developer through an API (application program interface) defined by a platform itself, for example.

Today's technology, supported by mobile wireless devices and the accompanied cellular infrastructure, may enable one or more community-driven applications. A community-driven application may be a software application executed in at least two mobile wireless devices of at least two community members and which can automatically send information to other mobile devices of some community members, using the cellular infrastructure and the application server, to use that information for their benefit, and vice versa.

A user of the community based application initially execute the application on his mobile wireless device, which in turn can establish an on-line connection with an application server using the cellular infrastructure and send and/or receive information, to and/or from the application server, for example. Community-driven applications are usually free to download and use, thus appealing to many users to download and enlarge the community of users that can add information.

SUMMARY OF DISCLOSURE

In growing number of cities around the world more families are having the capability to purchase and own a vehicle. Some places the capability has grown such that a family may own a plurality of vehicles. Exemplary vehicles may be: an automobile; a truck; a bus; a motorcycle; bike; etc. Henceforth the description drawings and claims of the present disclosure the term vehicle may represent the above group and the like.

The growing capability of owning vehicle(s) increases the amount of vehicles in the streets of many cities around the world. This may cause that the amount of vehicles on a road/street exceeds the amount of vacant parking places.

Thus drivers spend some of their driving time in search for a vacant parking place. Sometimes the driver may add a great amount of time (40 minutes, for example) to his/her drive just for the search of a vacant parking place.

When driving in search of a vacant parking place, one may add more air pollution; may be less attentive to the road thus may increase the rate of car accidents; may waste more fuel (a valuable finite resource); may add tension and irritate other drivers on the road thus more potential for accidents (vehicle wrecks). The above and more may decrease human quality of life.

Decrease in human's quality of life may be due to: frustrated and angry drivers searching for a vacant parking place when they are in a hurry; tensed and worried drivers that got lost while searching for a vacant parking place; unsatisfied drivers because there are too many vehicles on the road (since some are still in search of a vacant parking place) causing traffic and/or driving slow; more death or injuries do to unconcentrated drivers on the road; more money spent on fuel instead of other things; etc.

The above-described deficiencies do not intend to limit the scope of the inventive concepts of the present disclosure in any manner. They are presented for illustration only.

Exemplary embodiments of the present disclosure provide a novel system and method of a novel automatic-vacant-parking-place locator (AVPPL). Exemplary automatic-vacant-parking-place locator (AVPPL) system may comprise: an AVPLL application server; an AVPPL data base; and a plurality of AVPPL community members.

AVPPL community members may each have: a vehicle, a GPS, a camera, an on line connection to a server, and a connection to an AVPPL application.

Some exemplary embodiments of an automatic-vacant-parking-place locator (AVPPL) system and method may utilize an AVPPL community member's wireless mobile device such as, but not limited to a smartphone. An AVPPL community unity member's wireless mobile device may include: a camera, a GPS, one or more digital maps, and an online connection to one or more application servers, for example.

Exemplary wireless mobile device may be, but not limited to: APPLE iPhone, iPad, Samsung Galaxy series, and other smartphones using operating system such as but not limited to: iOS, ANDROID, WINDOWS MOBILE, SYMBIAN, and BLACKBERRY, PDAs, and so on.

Henceforth the description drawings and claims of the present disclosure the term smartphone may represent a wireless mobile device comprising a camera, a location analyzer (GPS, cell location by cellphone, etc.) and an online connection to an application server. Further a smartphone may have an AVPPL application.

In some exemplary embodiments the smartphone may further comprise: a computing core (CPU for example) together with a dedicated community-driven AVPPL application; one or more digital maps; a display (graphic, display for example); a G sensor; etc. In other embodiments the smartphone may have access to a computing core (CPU for example) together with a dedicated community-driven AVPPL application. In yet other embodiments a combination of both may be implemented.

An AVPPL community member may be required to place his/her smartphone in a place and way that its camera may face, at least partially, one of the street's sides where a car may park. Usually a rear camera will be used, thus the smartphone's main display will probably be facing the driver. Exemplary place to place the smartphone may be on a smartphone-holding device associated to the vehicle's front window.

Thus while driving the camera may capture, as video and/or as picture stills, the streets' long side. The images (from video or picture stills) may be image processed by an AVPPL processing unit, according to teaching of the present disclosure. The AVPPL processing unit may be inside the smartphone and/or in a server. The images may be processed to detect automatically vacant parking places. The information on the located vacant parking place may then be automatically sent toward one or more mutual databases for other AVPPL community members to be used.

An AVPPL community member may get (manually or automatically) information on a vacant parking place in an area he/she is searching for a parking place. Further an AVPPL community member may provide information on vacant parking place in different areas he/she is driving through, to other AVPPL community members and/or to an AVPPL database. The information on vacant parking place may be sent and/or received automatically or manually.

Exemplary automatic-vacant-parking-place locator (AVPPL) system and method may collect information from multiple AVPPL community members which automatically and/or manually detect and locate vacant parking places. AVPPL system and method may share the information with a plurality of AVPPL community members.

An exemplary AVPPL may detect and locate a vacant parking place to an AVPPL community member according the AVPPL community member's preference, for example. Exemplary preferences may be a parking size similar or bigger than the AVPPL community member's vehicle size, for example.

Some exemplary AVPPL embodiments may further determine different details on the detected and located vacant parking place. Different details such as, but not limited to: is the parking legal; is the parking free of charge; the cost of an hour parking; and so on. Exemplary AVPPL embodiments may present to an AVPPL community member a plurality of different vacant parking places to choose from in a predefined order.

Exemplary presentation of the different vacant parking places may be by: graphical display and/or text messages on the AVPPL community member's smartphone. The predefined order of presentation of the located vacant parking places may be determined according to the AVPPL community member's preferable desires. Preferable desires such as, but not limited to: first presenting parking places in a size above a predefined size, next the most "fresh" vacant place reported, next presenting parking places free of charge, next presenting parking place nearest to destination, and so on.

Some exemplary AVPPL embodiment may build a statistical occupancy database. An exemplary statistical occupancy database may store statistics on vacancy of parking places over the time of a day/week/weekend, and so on. This statistical occupancy database may help an AVPPL community member seeking vacant parking place if the community-driven AVPPL application may have no real-time, on-line information, for example. The statistical occupancy database may be stored in an AVPPL server, for example and/or may be downloaded to an AVPPL community member's smartphone.

Further an exemplary embodiment of an AVPPL may detect and locate the vacant parking places before the AVPPL's community member has reached his/her destination. Exemplary AVPPL's application server may collect vacant parking locations from a plurality of other AVPPL community members driving in proximity to the required destination. The AVPPL's application server may determine the most appropriate vacant parking place for the AVPPL community member according to his/her pre-defined parking preferences (size, cost, etc.) The chosen vacant parking place may then become the actually destination of that AVPPL community member seeking parking.

Even further an exemplary embodiment of an AVPPL may plan the route/course of that AVPPL community member seeking parking, in order for him/her to reach the located vacant parking place. An AVPPL may further guide, in real-time, the AVPPL community member toward the located vacant parking place. Thus guide the AVPPL community member toward his actual required destination. The guidance may be by audio, by signs on a map on the smartphones screen, by text, and so on.

In some exemplary embodiments AVPPL community members may get pictures of vacant parking place, taken by other community member's AVPPL application, for example.

In some embodiments the process of information detected from a camera may be processed by the AVPPL community members' smartphone itself. In other exemplary embodiment the information may be fetched and processed by an AVPPL server. In yet other exemplary embodiments a combination of both may be implemented, and so on.

Information on located vacant parking place may be automatically sent and saved in one or more mutual AVPPL databases associated to one or more AVPPL application servers. In some exemplary embodiments a mutual AVPPL database may be located in an AVPPL server's memory storage.

Information on located vacant parking place may be automatically sent to an AVPLL community member currently driving toward its location in order to verify if it is still vacant. Furthermore, the AVPLL database may automatically remove a vacant location from the database after some time from the time it was reported, assuming it is no vacant anymore.

In some exemplary embodiments an AVPPL community member may download information to his/her smartphone on vacant parking places, in areas he/she requires to park, from the mutual AVPPL databases.

In exemplary embodiments in which the AVPPL guides an AVPPL community member toward a located parking place, the guidance may be implemented in different ways. Exemplary ways may be: by voice commands through the smartphone's speaker, and/or by markings on the smartphone's display. Exemplary marking on the smartphone's display may be: a map where a vacant parking has been located, and/or a list if parking places utilizing street and building numbers as references, a path marked on a digital map, etc.

Exemplary voice commands may be: one or more names of streets and number of building where a vacant parking place has been located and information on the parking (fees, size, proximity to required destination) and/or guiding commands toward the located vacant parking place, etc.

In some exemplary embodiments the markings on the maps of the smartphone's maps may represent different types of parking information on the map. For example, the color of a mark may represent the size of the vacant parking place. Another example of different marking representation may be the intensity of the brightness of the mark. For example a vacant parking place that was located 1 minutes ago may be more bright than a vacant parking place that was located 5 minutes ago (the brightness may slowly fade away as time passes); Another example of different marking representation may be the geometric shape of the mark may represent if the parking is free or not. For example a triangle is a free parking place; and so on.

Some exemplary embodiments of AVPPL may determine if the detected and located potential vacant parking place is: legal; free of charge; the cost for an hour parking; residence only parking allowed, exit of a private parking and so on, by different methods and system. Exemplary methods and systems may be: image processing (detecting the colors that the sidewalk is colored, for example); utilizing information gotten from city council and/or a mapping service; etc. The information gotten from city council and/or a mapping service may be stored at an AVPPL Server and/or on an AVPPL community member's smartphones memory storage.

Some exemplary embodiments of AVPPL image processing may take into account different temporary obstacles. Obstacles such as, but not limited to: car wipers, a person standing in a vacant parking place, etc. The AVPPL may decide that these temporary obstacles will not be a problem for parking, and thus present the detected parking place as vacant. The AVPPL may further detect permanent obstacles such as, but not limited to: pillar, trees, entrance to a parking lot, etc.

In some embodiments of an AVPPL a calibration phase may be required. An exemplary calibration phase may comprise: tuning the placement of the a AVPPL community members' camera; determining the camera's parameters (focal number, lens distortion, frame rate for example); determining the maximum vehicle velocity the AVPPL community member may drive his/her vehicle when using the AVPPL; etc.

The calibration phase may be executed at the beginning of a drive; and/or when an AVPPL community member request to use the AVPPL database; and/or when first registering to an AVPPL community; and/or when detection that a calibration is required; and so on.

In an embodiment of a calibration an AVPPL community member may be requested to download and print a designated-for-calibration marked page. The AVPPL community member may be requested to take a picture of that paper using his/her smartphone's camera, at a specific position. Specific position may be in a certain distance and angle to a reference marked point on the designated-for-calibration marked page, and the like.

During the calibration and/or on a regular operation an AVPPL feedback mechanism may be implemented. The AVPPL feedback may be executed automatically by the AVPPL community member's smartphone; manually by the AVPPL community member; by an AVPPL server; and/or a combination of them.

The feedback mechanism may image process the video and/or pictures received from a community members' camera and accordingly determine if: a change on the placement of the camera is required; and/or if the AVPPL community member is needs to driver slower; etc.

The velocity of the community members' vehicle may be determined from the AVPPL community members' smartphones' GPS output. Thus when the community members' vehicle exceeds a certain threshold velocity value the AVPPL may send a warning signal; etc.

The AVPPL feedback mechanism may request a re-calibration in different cases. Exemplary case may be when a significant error is found between a known length of an object detected by the camera and the estimation of that objects' length by AVPPL image processing. Other AVPPL feedbacks may be warning signals. Exemplary warning signals may be if an AVPPL community members' camera view is disturbed or blocked.

Exemplary embodiments of an AVPPL may encourage AVPPL community members to begin operating the AVPPL as soon as they begin driving, by placing their smartphone camera at a smartphone holder where the camera is facing the front window and thus enabling the AVPPL to start detecting and locating parking places along the way for other AVPPL community members seeking to park at places the AVPPL community member pass along his/her drive.

Some exemplary embodiment of an AVPPL, the AVPPL community member's smartphone may automatically get commands and/or information from the AVPPL servers regarding areas that do not require detecting vacant parking places and/or areas that do require detecting vacant parking places.

Exemplary areas that do not require search of vacant parking place may be highways and/or remote unpopulated areas, for example. In areas where it is not required to detect vacant parking place the AVPPL community member's smartphone's AVPPL application may be turned to idle, thus can save battery life for the smartphone and reduce load on the system, etc.

Information on areas that do not require detecting vacant parking places may be sent automatically toward AVPPL community members' smartphone, for example. An AVPPL community member may then set his/her smartphone accordingly. In other exemplary embodiments the AVPPL application may be set automatically according to GPS information on the location of AVPPL community member's vehicle.

The AVPPL may further be utilized for different applications and/or implementation. Exemplary other applications and/or implementation may be: utilizing the images gotten from cameras of AVPPL community members' cameras to database for police use. Police use, such as, but not limited to: locating missing children, locating stolen cars, road accident documentation, burglaries in areas filmed, etc.

Exemplary embodiments of an AVPPL may implement different methods and systems to assess a size of a vacant parking place detected from a community member's camera. Some exemplary embodiments of an AVPPL may utilize the community member's GPS's clock, or smartphone's internal clock, for timing when the vehicle of the member pass a beginning edge of a detected vacant parking place and timing when the vehicle of the member pass the end edges of a detected vacant parking place.

AVPPL may further utilize the GPS for information on the vehicle's velocity and location. AVPPL may then multiply the measured time difference by the velocity of the vehicle and thus receive an estimation of the size of the vacant parking place for other community members that will seek parking in that area, for example.

Some exemplary embodiments of AVPPL may utilize the number of video frames, received from the community member's camera, between the front edge and the back edge of a detected vacant parking place when the AVPPL community member's vehicle passes near it. Then AVPPL may multiply the time difference, of the time frames, with the velocity of the AVPPL community member's car. Thus receive an estimation of the size of the vacant parking place for other community members that will seek parking in that area, for example.

Some exemplary embodiments of AVPPL may detect from the images, captured by an AVPPL community member's camera, a license plate of a parked car near a detected vacant parking place. This may assist to estimate the detected vacant parking place's real size. An AVPPL embodiment may utilize the known size of a standard license plate. According to the detected amount of pixels it occupied within the camera's captured picture and known actual size of the license plate the AVPPL may calculate the ratio between number of pixels and real area size.

According to the calculated ratio the AVPPL can determine the estimated vacant place size by the detected amount of pixel the vacant place occupied within the AVPPL community member's camera captured picture.

Other exemplary embodiments may detect from an AVPPL community member's camera a captured image of a parked car near a detected vacant parking place. An AVPPL embodiment may utilize the known size of a distance between standard car's wheels. According to the detected amount of pixels the distance between the car's wheels occupied within the camera's captured picture, the AVPPL may calculate the ratio between number of pixels and real area size. According to the calculated ratio the AVPPL can determine the estimated vacant place size by the detected amount of pixel the vacant place occupied within the AVPPL community member's camera's captured picture.

Another exemplary embodiment of AVPPL may include image processing of how many pixels captures a car presented on a picture from a member's camera. The car may be located nearby the vacant place. The AVPPL may accordingly determine by reference if the vacant parking place size is similar or larger than the car captured near it. The determination may be by comparing the number of pixels, for example.

Some exemplary embodiments may automatically detect the model of a nearby parked car captured by a member's camera. Browse and find details on the real size of that car. The details may be found in a database stored in the AVPPL community members' smartphone and/or in an AVPPL server. Accordingly a comparison between the number of pixels the parked car captured, together with info on its actual size, an assessment of the vacant-parking place may be determined according to the number of pixels it captures, and so on.

Other techniques may be a combination of the above. Yet other exemplary embodiments may use other techniques. The assessments of size may be done during the calibration process and/or in real-time and/or every pre-determined period of time, for example.

Some exemplary embodiments may automatically detect the angle of which the smartphone camera is facing relative to the road by receiving the camera angle from the smartphone internal compass and/or the G sensor and the road angle from the north from the GPS readings, subtracting the above two angles may reveal the relative angle to the road.

The relative angle may be used to determine the distance of the vacant place from the vehicle by using simple trigonometric calculation and by assuming the distance of the driving vehicle from the sidewalk.

Yet another exemplary embodiment may detect from the captured image the marks on a sidewalk. Marks such as, but not limited to: the blue and white marking which indicates allowed parking space in Israel, for example. By using a predefined estimation of the blue and white actual size, and counting the number of blue and white marking along the vacant parking place, an estimation of the real size of the vacant place may be determined.

An AVPPL community member may send information on his/her vehicle model and/or smartphone model when registering for the first time, for example. At the beginning of the drive the AVPPL community member may enter his/her required destination.

Some exemplary AVPPL may further comprise a signaling from an AVPPL community member when he/she is leaving a parking place. The information may be stored in a mutual database together with information on the size of the leaving vehicle. Further the AVPPL may reminder the AVPPL community member to stop paying for the parking in case the parking fee is via a smartphone.

More information on the AVPPL methods and systems is disclosed in conjunction with the figures below.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF DRAWINGS

Exemplary embodiments of the present disclosure will be understood and appreciated more fully from the following detailed description, taken in conjunction with the drawings in which.

DETAILED DESCRIPTION OF EXEMPLARY EMBODIMENTS

Turning now to the figures in which like numerals and/or labels represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures are for illustration purposes only and are not necessarily drawn to-scale and were chosen only for convenience and clarity of presentation.

Figure 1:
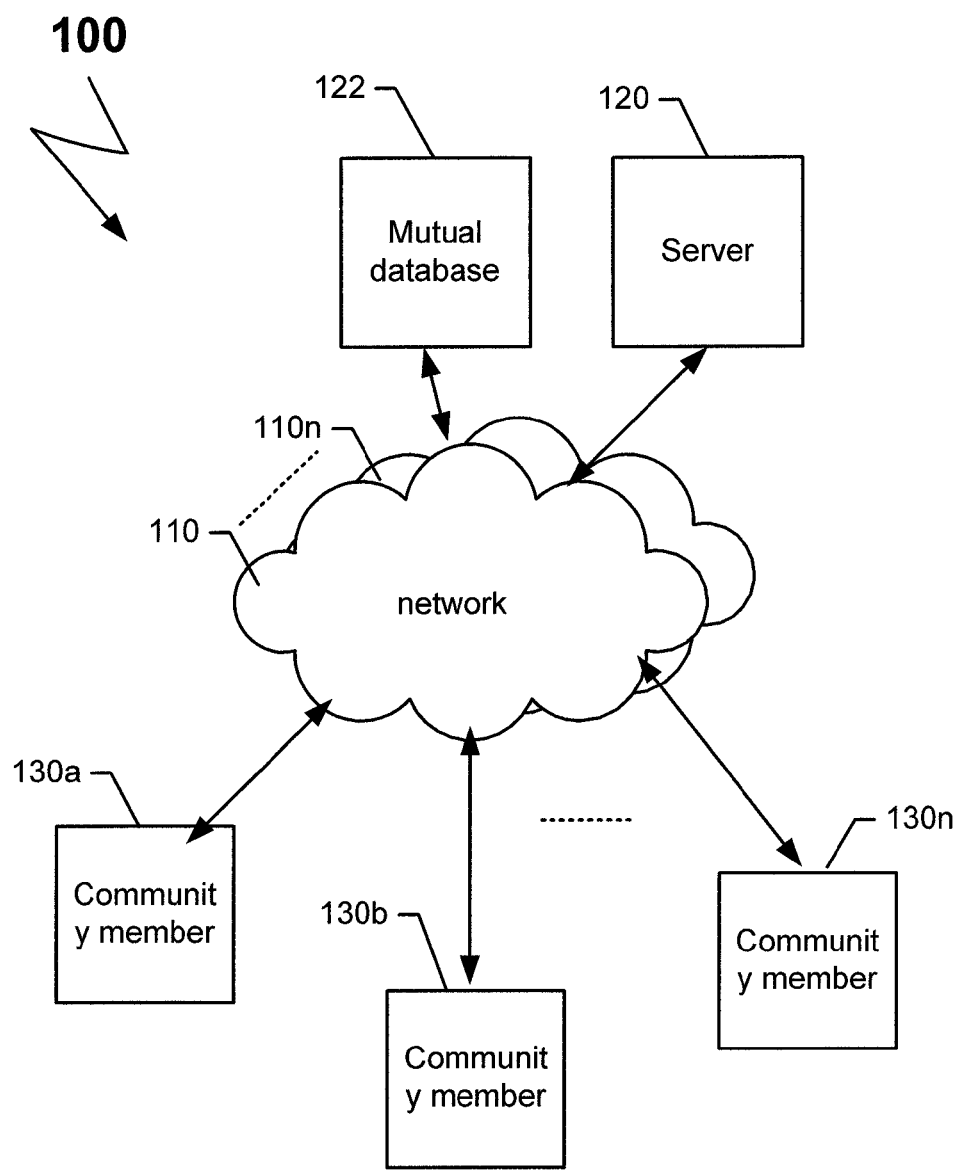
FIG. 1 illustrates a simplified block diagram with relevant elements of an exemplary portion of an AVPPL system, according to the teaching of the present disclosure.

FIG. 1 illustrates a block diagram with relevant elements of an exemplary portion of an AVPPL system 100. AVPPL system 100 may include a plurality of AVPPL community members 130a-n. An AVPPL community member 130a-n may each have: a vehicle, a GPS, a camera, an online connection to a server, and a connection to an AVPPL application. In some embodiments the AVPPL community member 130a-n may utilize a smartphone comprising: a GPS, a camera, an online connection to a server, and a connection to an AVPPL application. AVPPL system 100 may further include one or more networks 110a-n, an application server 120, and a mutual database 122. In some exemplary embodiments the server 120 may comprise the mutual database 122.

The plurality of AVPPL community member 130a-n may be associated via the one or more networks 110a-n to the application server 120 and/or to the mutual database 122. In an exemplary embodiment, the application servers 120 and/or mutual database 122 may be located in a node of the network 110 or in a terminal that receives several channels from access ports and, according to certain criteria, processes information and distributes them.

The application server 120 may be an AVPPL application server, for example. AVPPL application server is only one of many different network servers that can implement the teachings of the present disclosure. Therefore the present disclosure should not be limited to AVPPL application server only. The server 120 may represent a single server or a combination of two or more server. The mutual database 122 may represent a single mutual database or a combination of two or more mutual databases.

The network 110 may represent a single network or a combination of two or more networks such as, but not limited to: cellular data network such as Global System for Mobile Communications (GSM), General Packet Radio Service (GPRS), Internet, a circuit switched network, and so on.

An AVPPL community member 130 may be an entity on the network 110, capable of providing real-time two-way information (by his/her smartphone manually or automatically for example) with other AVPPL community member 130 and/or with the server 120 and/or with the mutual database 122.

Exemplary information communicated between the AVPPL community member 130a-n and the server 120 and/or with the mutual database 122 may include: video information, GPS information (time, velocity, location, etc), one or more detected and located vacant parking place, information on detected and located vacant parking place, verifying the existence of a prior detected and reported vacant place sent, etc.

An AVPPL community member's smartphone may have an online connection to the server 120 and/or to the mutual database 122 via one of the network 110a-n.

Exemplary smartphones may be: APPLE iPhone, iPad, Samsung Galaxy series, and other smartphones using operating system such as but not limited to: iOS, ANDROID, WINDOWS MOBILE, SYMBIAN, and BLACKBERRY.

In some exemplary embodiments the AVPPL community member's 130a-n smartphone may further comprise: a computing core (CPU for example) together with an AVPPL application; one or more digital maps; a display (graphic, display for example); a G sensor; etc.

An AVPPL community member's smartphone missing one or more of the above components may be limited in the ways in which that AVPPL community member 130a-n may participate in the AVPPL community.

The described portion of AVPPL system 100 comprises and describes only the relevant elements. Other sections of an exemplary embodiment of an AVPPL system 100 are not described. It will be appreciated by those skilled in the art that depending upon its configuration and the needs of the AVPPL system, each AVPPL system 100 may have other number of AVPPL community member, networks, servers, and other components, etc.

However, for purposes of simplicity of understanding, three AVPPL community members 130a-n with three smartphones which comprise an AVPPL application, a plurality of networks 110a-n with one server 120 and one mutual database 122 are shown.

Figure 2:
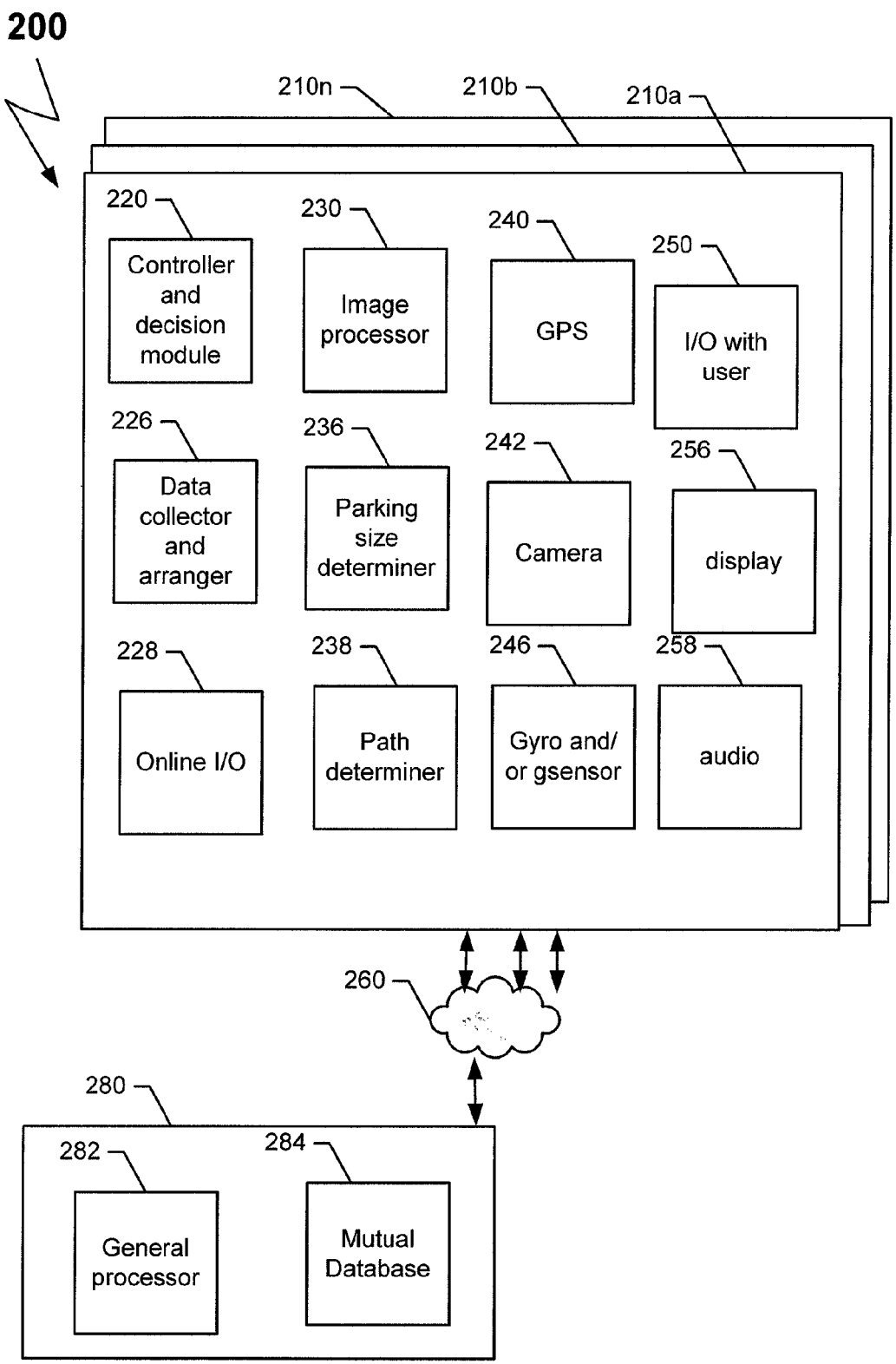
FIG. 2 illustrates a simplified block diagram with relevant elements of an exemplary portion of an AVPPL system and apparatuses, according to the teaching of the present disclosure.

FIG. 2 depicts a block diagram with relevant elements of an exemplary portion of an AVPPL system 200. Alternative embodiments of the AVPPL system 200 may have other components and/or may not include all of the components shown in FIG. 2. AVPPL system 200 may comprise a server 280, a network 260, and a plurality of exemplary AVPPL community member's smartphone 210a-n.

Some exemplary embodiments of an AVPPL community member's smartphone 210a-n may comprise: an Input/output Interface (I/O) 228. The Input/output Interface (I/O) 228 may act as an interface between the AVPPL community member's smartphone 210 internal modules and the server's 280 internal modules and/or interface to another AVPPL community member's smartphone 210a-n, for example.

In one direction the Input/output Interface (I/O) 228 can get information from one or more of the plurality of AVPPL community member's smartphone 210 and/or from the server 280 via the network 260, for example. The Input/output Interface (I/O) 228 can deliver the different information toward the relevant modules/units of that AVPPL community member's smartphone 210.

In some exemplary embodiments the Input/output Interface (I/O) 228 may process obtained information. Accordingly the Input/output Interface (I/O) 228 may decide toward which module/unit to transfer the information. Further some exemplary Input/output Interface (I/O) 228 may convert the information format to a required communication standard required by the receiving module/unit.

In the other direction the Input/output Interface (I/O) 228 can transfer information from the AVPPL community member's smartphone 210 internal modules/units to one or more other AVPPL community member's smartphone 210 and/or toward the server 280 via network 260. Input/output Interface (I/O) 228 may receive separate streams from the various units of that AVPPL community member's smartphone 210. Some exemplary Input/output Interface (I/O) 228 may convert the information format to a required communication standard required by the receiving entity.

An exemplary embodiment of an AVPPL community member's smartphone 210 may also comprise a data collector and arranger module 226. The data collector and arranger module 226 may also be associated to a memory storage (not shown in drawing). Exemplary embodiments of a data collector and arranger module 226 may collect and arrange information gotten from other internal modules of the smartphone 210 and/or from other AVPPL community member's smartphone 210 and/or from server 280.

Exemplary information may be: information on vacant parking places (location, size, fees, time, etc.); video or still images of one or more sides of roads; digital maps of the street or the road of where the allowed parking spots are; GPS inputs (time, vehicle velocity, location, etc.); routes, and so on.

The data collector and arranger module 226 may arrange the information according different parameters. Exemplary parameters may be: their relevance, the time obtained, the type of information (GPS location, pictures, etc.), and so on. The data collector and arranger module 226 may mark by a time stamped different information, for example. It may also report to other AVPPL community member's smartphone 210 and/or the server 280 that a reported vacant place is no longer vacant if the AVPPL community member decides to park there. The reported may be sent with a time stamp, for example.

An exemplary embodiment of an AVPPL community member's smartphone 210 may also comprise a GPS module 240 and a camera 242. The GPS module 240 may provide different inputs. Inputs such as, but not limited to: the location and location accuracy of the AVPPL community member's, input on time, the velocity of the AVPPL community member's, the number of GPS satellite, etc.

The camera 242 may record pictures and/or videos of one or more sides of the road the AVPPL community member's is passing through. The information from the GPS 240 and/or camera 242 may be used by internal modules of the AVPPL community member's smartphone 210; and/or may be obtained for use by one or more other AVPPL community member's smartphone 210a-n; and/or may be obtained for use by the server 280.

Some exemplary embodiment of an AVPPL community member's smartphone 210 may comprise an image processor 230, for example. Exemplary embodiments of an image processor 230 may get images (picture stills and/or video) from the camera 242. Further the image processor 230 may get images from other AVPPL community member's smartphone 210 and/or from server 280, via the Input/output Interface (I/O) 228, for example. The image processor 230 may process the image(s) and output different information.

Exemplary information may be the outlines of images. The image processor 230 may detect different obstacles in an image that are not required for determining size of parking. Exemplary obstacles may be: car wipers, man standing in street, and so on. Accordingly the image processor 230 may delete the obstacles from the images. Furthermore the image processor 230 may process the image and detect: vehicles, colors, trees, and so on.

Thus the image processor may output if a side walk is in the color that permits parking or not, for example. The image processor 230 may process the image and detect empty space between vehicles, and so on. The image processor 230 may detect that the image is too dark or too bright and to send commands toward the camera 242 to change the camera internal settings to improve the picture quality, such as aperture size and/or shutter time for example.

Accordingly the image processor 230 may output data and/or images and/or processed images toward different modules of the AVPPL community member's smartphone 210 itself. Different modules such as, but not limited to a parking size determiner 236. The image processor 230 may output data and/or images and/or processed images toward other AVPPL community member's smartphone 210 and/or toward a server 280 via the Input/output Interface (I/O) 228, for example.

The image processor 230 may get the internal parameters of the camera 242 such as its focal point and aperture size, for example, as parameters for determining vacant parking size.

An exemplary embodiment of a parking size determiner 236 may obtain inputs from different modules of the AVPPL community member's smartphone 210 itself. Exemplary other modules may be: image processor 230, GPS 240, camera 242, data collector and arranger 226, etc. An exemplary embodiment of a parking size determiner 236 may obtain inputs from other AVPPL community member's smartphone 210 and/or from a server 280 via the Input/output Interface (I/O) 228, for example.

The parking size determiner 236 may determine the size of an empty space in an image, for example. The parking size determiner 236 may use one or more techniques to determine the size of an empty space. Exemplary techniques may determine the parking size: according to number of pixels; according to reference to other objects in the image; according to geometric of the items in an image; and so on.

The parking size determiner 236 may also utilize information gathered from a calibration phase made earlier, if any, and/or take part in a calibration phase, and so on. The parking size determiner 236 may also output the data and/or images and/or processed images toward other AVPPL community member's smartphone 210 and/or to a server 280 via the Input/output Interface (I/O) 228, for example.

An exemplary embodiment of an AVPPL community member's smartphone 210 may also comprise a controller and decision module 220. The controller and decision module 220 may obtain inputs and/or send inputs from/to the AVPPL community member himself via: an input/output interface (I/O) 250; and/or a display 256 (may be a touch screen display, for example); by an audio module 258 (voice commands, for example).

Exemplary display inputs and given by the community member himself may utilize a using a projected on-screen keyboard or a map, for example. The community member may type or pinpoint his destination. He/she may further add a requested maximum-distance of a located vacant parking place from the required destination.

The controller and decision module 220 may obtain inputs from different modules in the AVPPL community member's smartphone 210 itself; and/or from another AVPPL community member's smartphone 210*a-n*; and/or from server 280. Exemplary inputs may be processed images from an image processor 230, vacant parking size from a parking size determiner 236, different inputs from GPS 240 (time, velocity locations, etc.), requested destination from different AVPPL community member 210, maps, information on vacant parking place, and so on.

The controller and decision module 220 may send commands toward one or more different modules in the AVPPL community member's smartphone 210 itself; and/or toward other AVPPL community member's smartphones 210; and/or toward the server 280, for example. Exemplary commands may be sent toward a path determiner 238, for example. Exemplary command may be: to determine a path from the location of the AVPPL community member's smartphone 210 (according to GPS 240, for example) to point A which is where a proper vacant parking place has been detected and located.

Other exemplary commands may be: to send information regarding the path to a vacant parking place and/or to display a map with the marked path on it to the required AVPPL community member's smartphone 210, for example. The information may be displayed on a display 256 of an AVPPL community member's smartphone 210; and/or may be given by audio via an audio module 258, for example. And or a combination of them.

Some exemplary embodiments of an AVPPL community member's smartphone 210 may comprise a gyro and/or g-sensor 246 in order to determine the placement of the camera, for example. The information may be passed toward the image processor 230 and or the parking size determiner 236, for example.

The input/output interface to user 250 may also be used by AVPPL community member. Exemplary use may be entering information on vehicle size and/or vehicle type; required destination location; request to enter an AVPPL community service; etc.

An exemplary embodiment of a server 280 may comprise and/or be associated to one or more mutual database 284. An exemplary embodiment of a mutual database 284 may comprise information obtained from different AVPPL community member's smartphone 210 and/or from city councils, etc. Information such as, but not limited to: images with time stamps, info on general parking places in the city (location, size, fees, time allowed for public parking and for residence only, etc.), etc.

An exemplary embodiment of a server 280 may comprise a general processor 282 that may manage the one or more mutual databases, and/or process information received by different AVPPL community member's smartphone 210 and/or from city councils, for example. A general processor 282 may process gotten images, gotten GPS inputs, requested parking place, etc. Accordingly a general processor 282 may determine paths for one or more AVPPL community member and send the information toward the relevant AVPPL community member's smartphone 210, and so on.

The network 260 may represent a single network or a combination of two or more networks such as, but not limited to: cellular network, Internet, and so on.

Figure 3A:
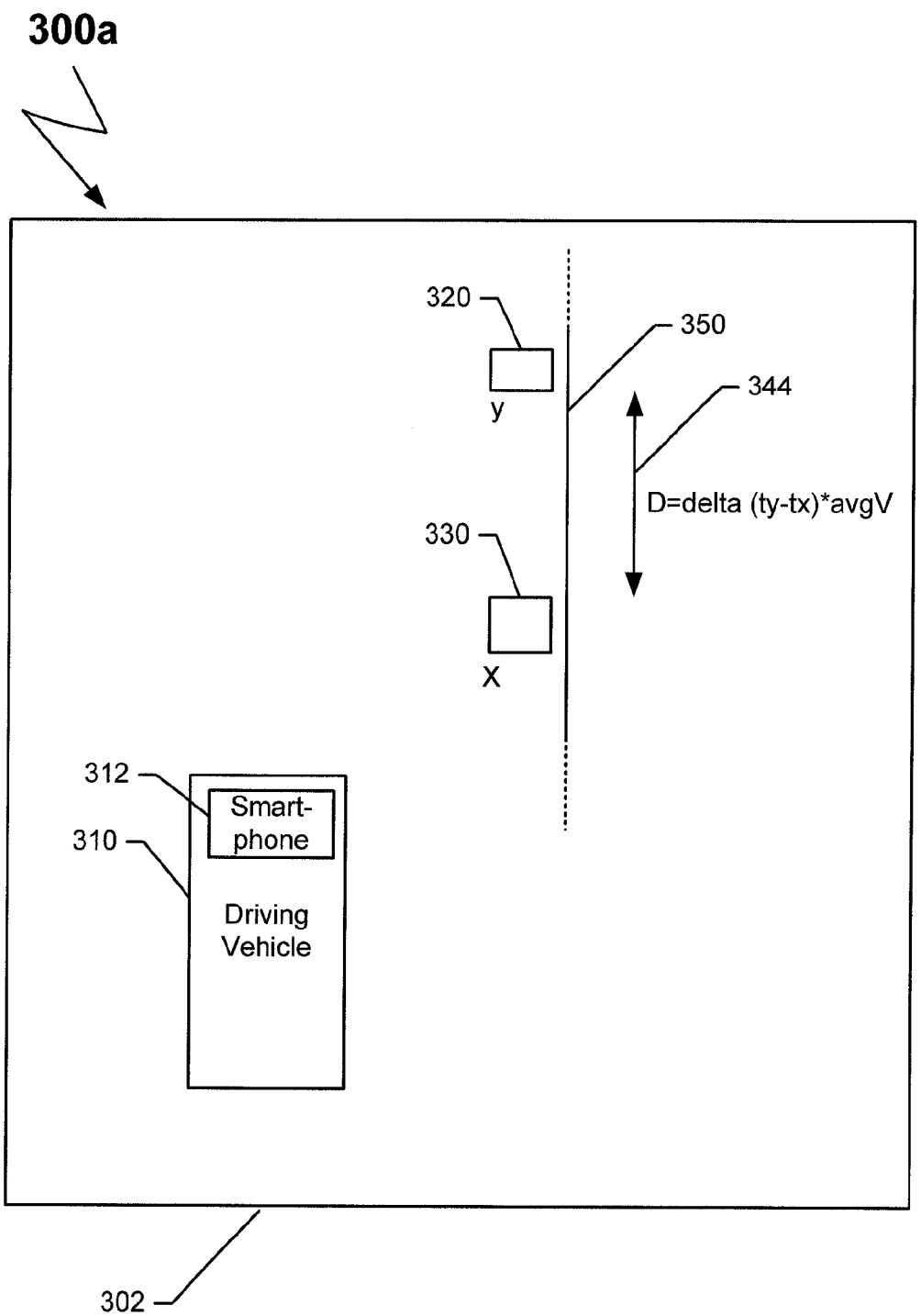
FIGS. 3a-b illustrates a simplified diagram with relevant elements of an exemplary portion of an embodiment of AVPPL determining a vacant parking place size, according to the teaching of the present disclosure.

FIG. 3*a* illustrates a simplified diagram with relevant elements of an exemplary portion of an embodiment of AVPPL method and system 300*a* of determining a vacant parking place size. Exemplary AVPPL method and system 300*a* may include a driving vehicle 310 comprising a smartphone 312. Wherein the smartphone's camera has an open view to at least part of a street 302 the vehicle is driving through. In the exemplary embodiment there are two static reference items 320 and 330 in the street 302 with a vacant parking place between them, and a side walk 350. The two or more reference static items 320 and 330 may be: parked cars, stationary trash container, trees, pillars, etc.

The smartphone 312 may include: a camera, a GPS, and an online connection to one or more servers, for example. The smartphone's camera may be facing to the front window of the car capturing the side of the street 302 with the side walk 350 where both reference items 320 and 330 are placed.

In an exemplary embodiment the smartphone's camera 312 may capture (by video and/or by still pictures) the reference items 320 and 330 while the vehicle 310 is driving. The smartphone's 312 GPS may give time stamps to a few of the captured images (video and/or stills) by the camera. The velocity of the car may be deduced by inputs from the smartphone's 310 GPS, for example. Inputs such as but not limited to a plurality of locations with timestamps.

Accordingly a processing unit (in the smartphone 310 itself and/or in an associated server via an online connection to the smartphone 310 or a combination of them) may get the inputs from the smartphone's 310 GPS and camera 312. Process the information and calculate the distance D 344 between both reference items 320 and 330 according to the two time stamps when the ear passed reference items 320 and 330 (at point X and Y, for example) and the average velocity of the vehicle 310 when driving between the reference items.

Furthermore the processing unit may image process the images from the camera and detect the markings on the sidewalk 350 in the vacant area (between point X and Y). Exemplary markings may be alternating blue and white markings that represent parking information in certain countries. According to the colors, for example, the image processor may determine if the parking is legal and/or if needs to be paid.

Furthermore, from a prior knowing of the real size of each blue-white marking, an exemplary AVPPL may deduce the size of the vacant parking place (D) 344, by counting the number of markings between X and Y and multiplying by the real size of the blue white marks.

The distance D 344 (between point X and Y) together with its location (according to the smartphone's 310 GPS, for example) and together with the information on the fees (taken from city councils, for example) may then be obtained by different entities. Exemplary entities may be: different AVPPL community members seeking vacant parking place for a vehicle in size D 344 or less; and/or mutual databases; and/or servers; etc. Furthermore the processing unit may create a conversion between the number of pixels and the calculated length D for future use, for example.

Figure 3B:
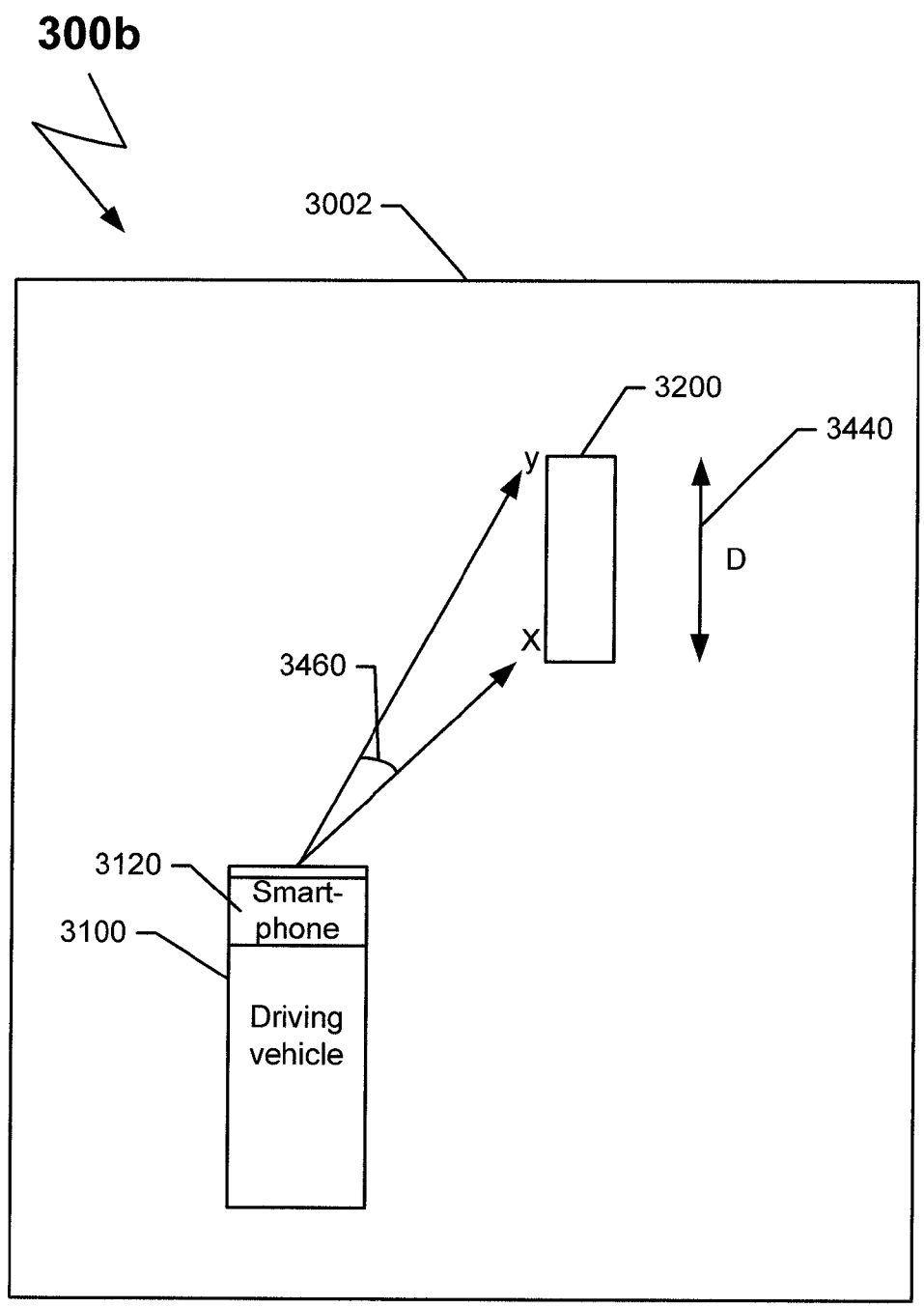

FIG. 3b illustrates a simplified diagram with relevant elements of an exemplary portion of an embodiment of an AVPPL method and system 300b of converting image's pixels to cm. AVPPL method and system 300b may include a vehicle 3100 comprising a smartphone 3120, and at least one static reference items 3200 in a street 3002. The reference item 3200 may be a car, for example.

The smartphone 3120 may include: a camera, a GPS, and an online connection to one or more servers, for example. The smartphone 3120 may be associated to the front window of the car facing the side of the street 3020 where the item 3200 is located.

In an exemplary embodiment the smartphone's 3120 camera may video and/or take pictures of the reference 3200 items while the vehicle 3100 is driving. A processing unit (associated to the smartphone and/or to a server) may image process the images from the smartphone's 3120 camera. If the processing unit detects that the reference item 3200 is a vehicle it may count the number of pixels that vehicle 3200 captured in the image (D pixels 3440, for example). Accordingly the processing unit may define that the number of pixels defining a size of a vehicle detected in future pictures on the about same angle 3460 from the camera plane, is at least the number of D pixels the image captured.

In some exemplary embodiments the processing unit may further identify the type of vehicle 3200 and may utilize a database (associated to the smartphone or server, for example) with information on the exact size of detected the vehicle 3200. Thus the conversion from pixels to cm may be more accurate.

The above information may be used later on when searching for a vacant parking place in wanted areas using the smartphone's camera 3120, for example.

Figure 4A:
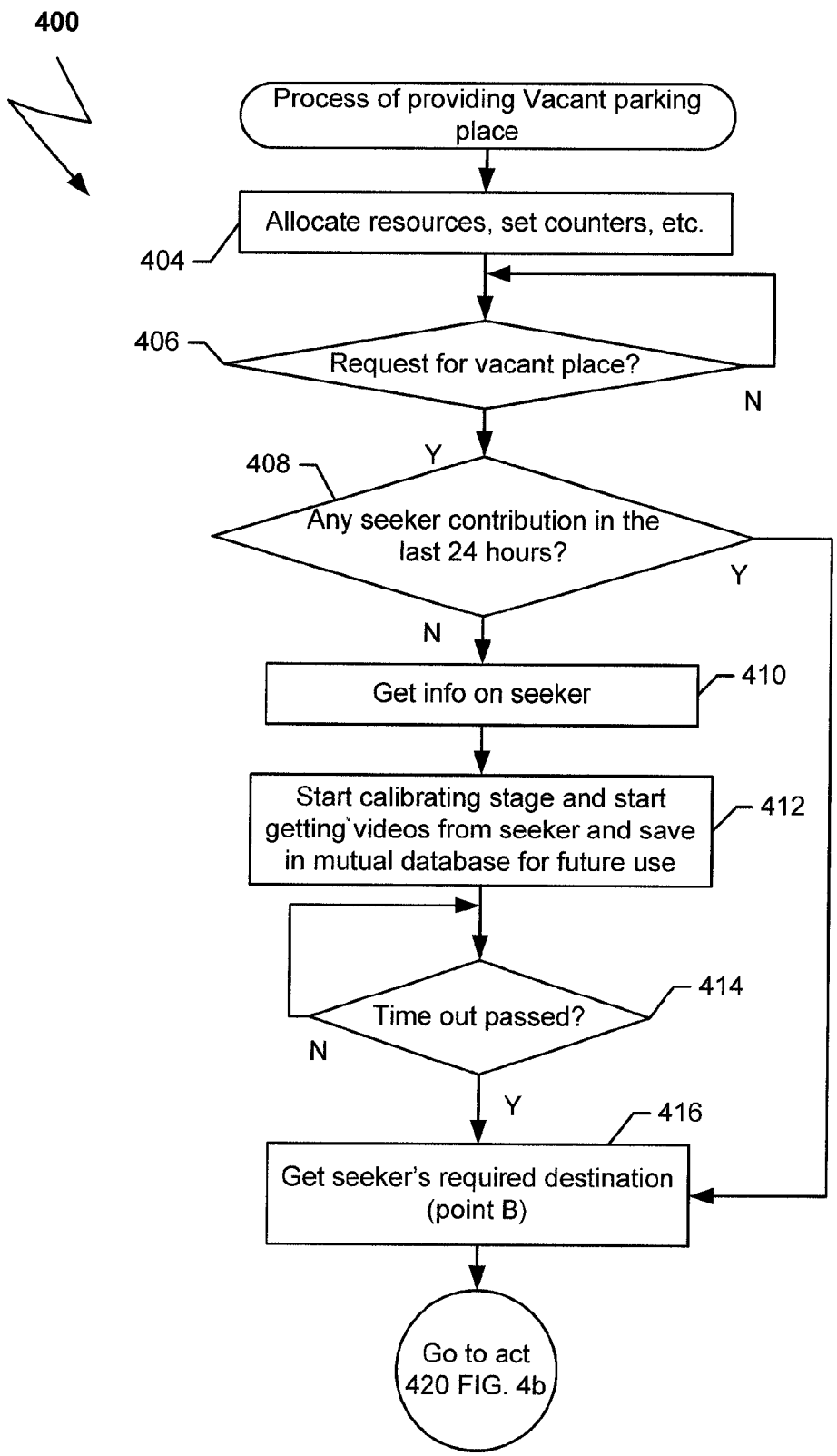
FIGS. 4a-c depicts schematic illustrations of simplified flowchart with relevant blocks of an exemplary AVPPL method, according to the teaching of the present disclosure.

FIG. 4a depicts schematic illustrations of simplified flowchart with relevant acts of an exemplary AVPPL method 400 for providing inputs on detected and located vacant parking places. In some exemplary embodiments AVPPL method 400 may be executed by a server. In other exemplary embodiment the AVPPL method 400 may be executed by the AVPPL community member's smartphone. Yet other exemplary embodiments may be a combination of both.

Method 400 may begin by allocating 404 different sources, and setting/resetting 404 different counters. Exemplary sources may be mutual databases, online, information on the AVPPL community members, information on parking from city councils, etc.

Method 400 may wait 406 until a request for a parking place is obtained 406. When a request for a parking is obtained 406, method 400 may verify 408 if the AVPPL community member requesting has contributed information to the AVPPL community. The contribution may be during the last 24 hours, for example. In some exemplary embodiment an AVPPL community member does not have to contribute before seeking parking.

If 408 the AVPPL community member requestor has contributed then method 400 may proceed to act 416. If 408 not, then method 400 may get 410 information on the AVPPL community member. Information such as, but not limited to: type/size of his/her vehicle; the AVPPL community member smartphone's cellular network; the AVPPL community member's type of smartphone; etc. The above type of information may be entered by the AVPPL community member and/or be automatically downloaded from his/her smartphone.

Next a calibration phase may begin 412. A calibration phase may comprise: adjusting the location of the camera, adjusting the AVPPL community member's vehicle velocity, etc. Next method 400 may gather 412 information from the camera and/or processed information from the smartphone of the AVPPL community member regarding the street he/she is driving through. In some exemplary embodiments the collecting phase may be for a predefined period of time before the user may be entitled to receive information on vacant parking place close to his/her required destination.

Figure 4B:
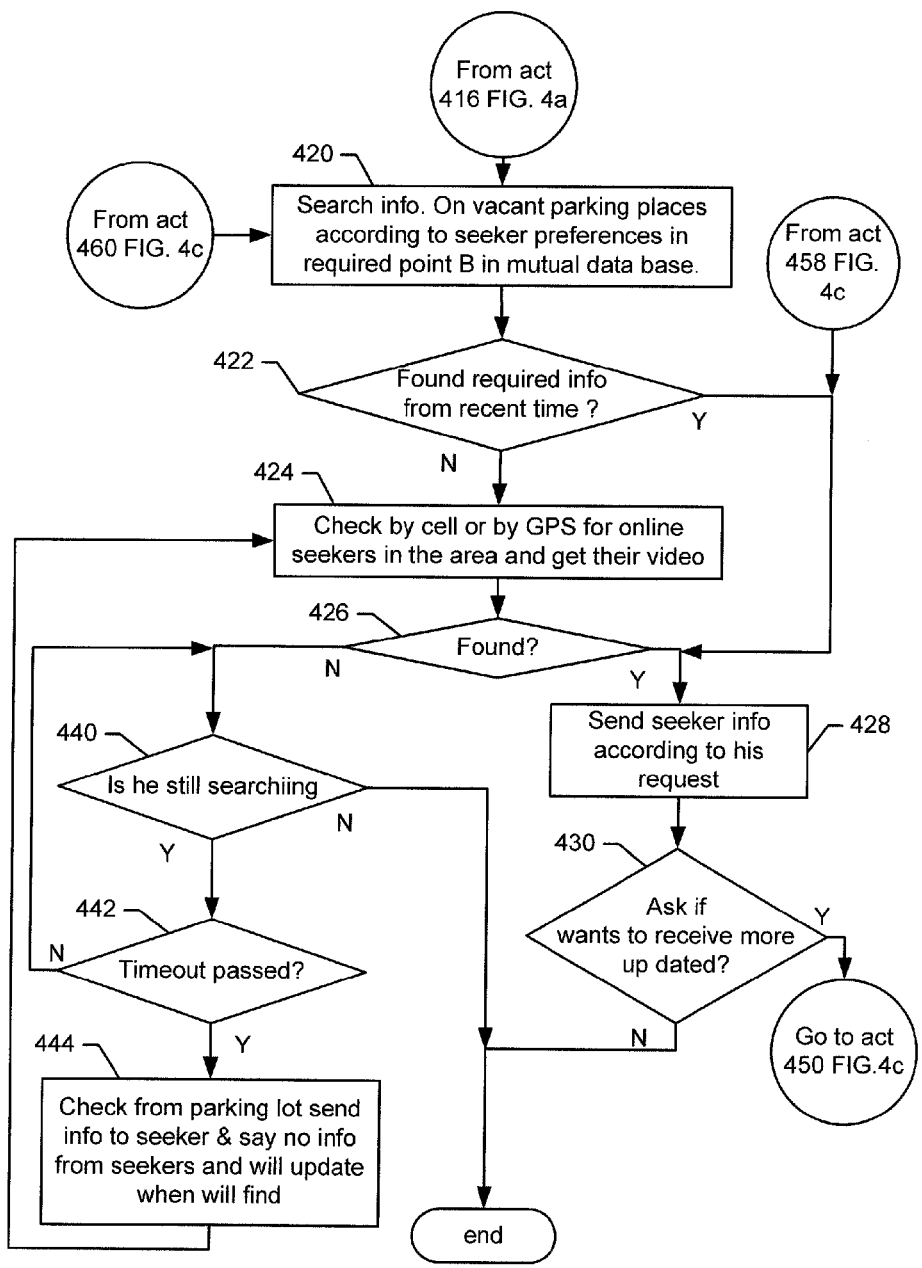

After a pre-defined time has passed 414, method 400 may get 416 the required destination of the AVPPL community member (point B, for example). Next method 400 may proceed to act 420 FIG. 4b. At act 420 method 400 may search 420 for information on vacant parking place in close proximity to the AVPPL community member's required destination (point B). Close proximity may be: a few meters, a few streets, and so on. The proximity radius may differ by time and/or location and/or AVPPL community member's preference, and so on. Method 400 may search 420 in mutual databases or in other AVPPL community members' smartphones, for example.

In some embodiments method 400 may limit the search to vacant parking place according to the size of the AVPPL community member's vehicle. Even further method 400 may limit the search to other required parameters that an AVPPL community member wishes. Exemplary other required information may be: costs of the parking place, its proximity to destination, etc.

If an appropriate vacant parking place has been found 422, then method 400 may proceed to act 428. If 422 not, then method 400 may check 424 if other AVPPL community members are in area close to the AVPPL community members' required destination, and get video and/or pictures and/or data on vacant parking places from them.

If a proper vacant parking place has been found 426, then the information may be sent 428 toward the AVPPL community member. The information may be sent by audio and/or by display on the AVPPL community member's smartphone, for example. The AVPPL community member may be asked if he/she wants to stay online 430 and receive more relevant and/or updated information if will be found. If yes 430, then method 400 may proceed to act 450 FIG. 4c. If 430 not, then method 400 ends.

Returning to act 426, if no proper vacant parking place is found for the AVPPL community member, then method 400 may check if the AVPPL community member is still searching for 440 a vacant parking place. If not 440, then method 400 may end. If 440 yes, then method 400 may wait till a timeout pass 442. After time out pass method 400 may check 444 for information from parking lots, for example, and return to act 424.

Figure 4C:
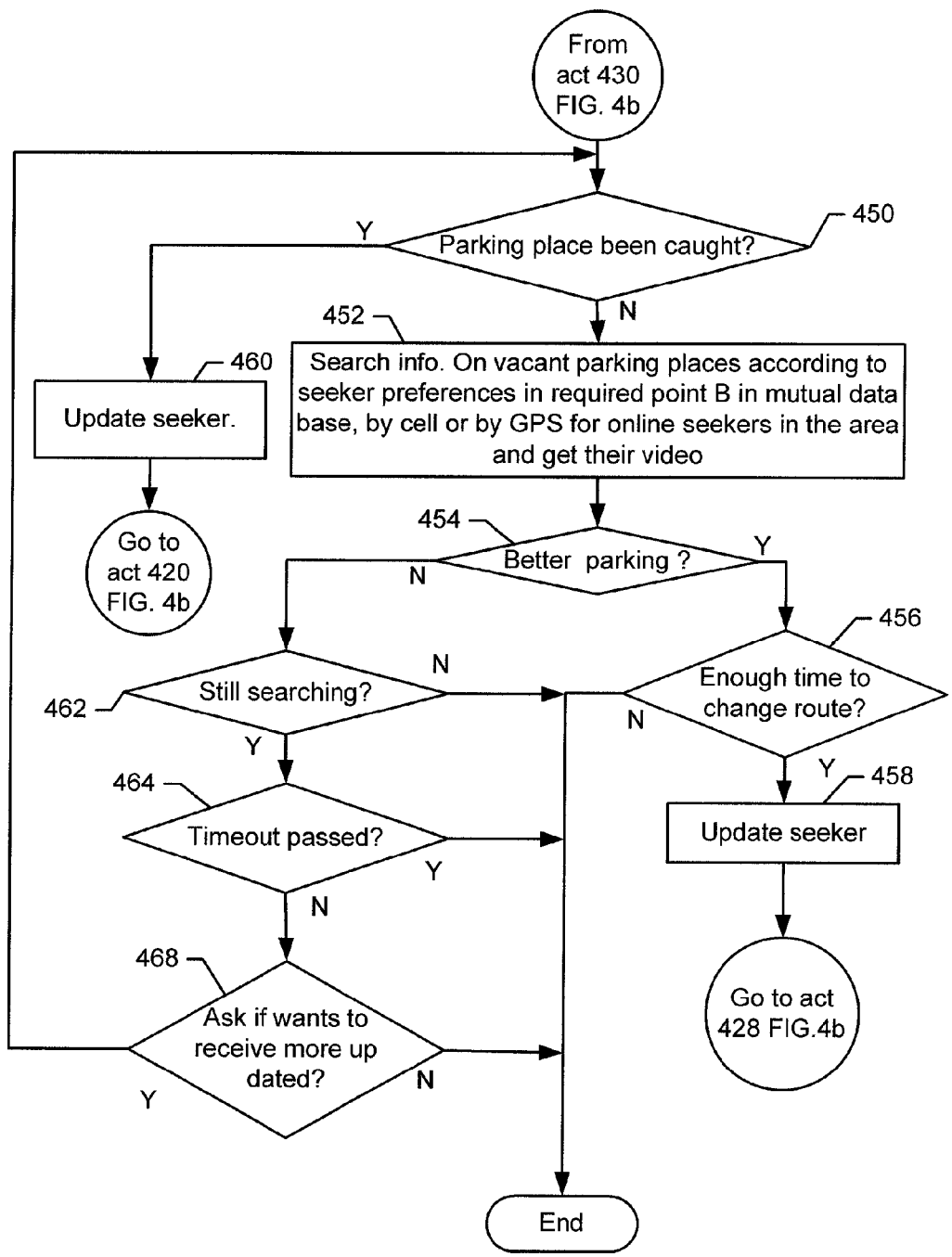

Turning to act 450 FIG. 4c, method 400 may verify if the parking place is still vacant 450. If not 450, then the method 400 may inform 460 the AVPPL community member that the parking place has been caught by another, and method 400 may return to act 420 FIG. 4b. If 450 the parking place is still vacant method 400 may search for a better vacant parking place. Better may be according to different criteria. Exemplary criteria may be: closer to required destination, free of charge parking, larger size parking place, etc. Method 400 may search 452 in mutual databases; inquire from other AVPPL community members' smartphones, etc.

If 454 a better parking place has been found method 400 may check if there is enough 456 time to change the AVPPL community member route. If 456 not, then method 400 does not change the route of the AVPPL community member and method 400 ends. If 456 there is enough time to change route method 400 may update the user 458 and go to act 428 FIG. 4b.

Returning to act 454. If no better parking place has been found, method 400 may verify if the AVPPL community member is still searching 462 for a vacant parking place (if user has not logged off, for example). If 462 not, then method 400 may end. If 462 yes, then method 400 may check if a timeout has passed 464. If yes, method 400 may end. If 464 not then method 400 may verify if the AVPPL community member wants to stay online and receive more updated information. If 468 not, then method 400 may end. If 468 yes, then method 400 may return to act 450.

Figure 5:
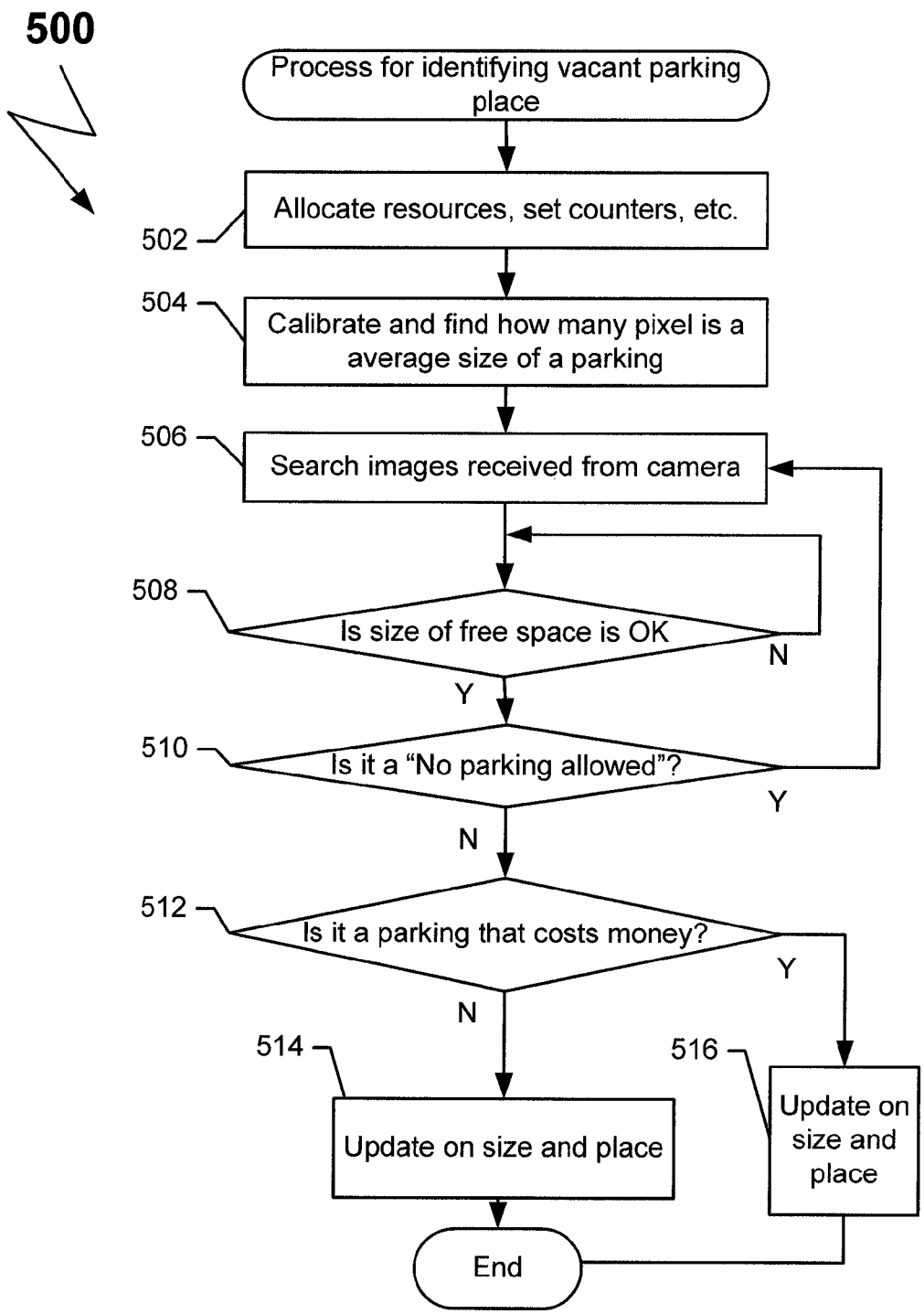
FIG. 5 depicts schematic illustrations of simplified flowchart with relevant blocks of an exemplary AVPPL method for detecting a vacant parking place, according to the teaching of the present disclosure.

FIG. 5 depicts a schematic illustration of a simplified flowchart with relevant blocks of an exemplary AVPPL method 500 for detecting a vacant parking place. In some exemplary embodiments AVPPL method 500 may be executed by a server. In other exemplary embodiment the AVPPL application method 500 may be executed by an AVPPL community member's smartphone. Yet other exemplary embodiments may be a combination of both.

The information on vacant parking place may be sent toward a mutual database, and/or one or to one or more servers, and or one or more AVPPL community member, for example. Method 500 may begin by allocating 502 resources and setting/resetting 502 counters. Exemplary resources may be AVPPL community member's camera, image processors, mutual databases, etc.

Next a calibration process may be made 504. The calibration process may comprise detecting 504 an average size vehicle in a gotten video and/or picture image. Accordingly determining 504 the number of pixels that represent an average size vehicle. The calibration process may be done by the smartphone of an AVPPL community member, and/or by a server for example.

Next method 500 may process images received from the same AVPPL community member. Method 500 may search for 508 a free space along a sidewalk of a street the AVPPL community member vehicle is passing through and capturing with his/her camera, for example. When a free space has been detected 508, then the number of pixels occupied by the free space may be compared to the number of pixels that represent an average size vehicle.

If 508 the free space is bigger or equal to the average size vehicle then method 500 may verify 510 if it is a legal parking place. Verification may be according to the colors marking the sidewalk near the vacant parking place, and/or according to data from database, and/or according to data from city council database, etc. If 510 the parking space is not legal then method 500 may return to act 506.

If 510 the parking space is legal method 500 may verify 512 if the parking costs money. If 512 the parking costs money method 500 may update 516 the AVPPL community member on the vacant parking place location and fees. And method 500 may end. If 512 the parking does not cost money method 500 may update 514 the AVPPL community member on the vacant parking place location. The method 500 may then end.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb and further, all of the listed objects are not necessarily required in all embodiments.

As used herein, the singular form "a", "an" and "the" include plural references unless the context clearly dictates otherwise. For example, the term "a material" or "at least one material" may include a plurality of materials, including mixtures thereof.

In this disclosure the words "unit", "element", "device", and/or "module" are used interchangeably. Anything designated as a unit, element, device and/or module may be a stand-alone unit or a specialized module. A unit, element, and/or module may be modular or have modular aspects allowing it to be easily removed and replaced with another similar unit, element, device, and/or module. Each unit, element, device, and/or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the disclosure. The described embodiments comprise different features, not all of which are required in all embodiments of the disclosure. Some embodiments of the present disclosure utilize only some of the features or possible combinations of the features. Many other ramifications and variations are possible within the teaching of the embodiments comprising different combinations of features noted in the described embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

It will be appreciated by persons skilled in the art that the present disclosure is not limited by what has been particularly shown and described herein above. Rather the scope of the invention is defined by the claims that follow.

I claim:

1. An automatic-vacant-parking-place locator (AVPPL), comprising:
   a server;
   a plurality of wireless mobile devices, each of the wireless mobile devices associated with an AVPPL community member and a vehicle of the respective AVPPL community member vehicles, each of the wireless mobile devices comprising:
   a camera;
   a location analyzer;
   an online connection to the server; and,
   each of the wireless mobile devices for placement in the vehicle of the AVPPL community member so that the camera can capture at least one side of a road the vehicle passes along, the location analyzer is configured to detect location data about the vehicle of the AVPPL member associated with the respective wireless mobile device;
   a processor programmed to: 1) receive from one or more of the wireless mobile devices one or more camera images of at least one side of a road the associated vehicles passes along and location data from the corresponding location analyzers; 2) detect and locate a vacant parking place along the road for another AVPPL community member seeking to park along the road by processing the obtained images and the location data to provide processed information comprising the detection and the location of the vacant parking place along the road; and,
3) determine the size of the detected and located vacant parking place so as to be a suitable parking place for multiple vehicles of the AVPPL community members, the size including the length of the detected and located vacant parking place; and, a mutual database associated with the server and configured to obtain the processed information from the processor and to provide, from the processed information, the location of the vacant parking place via the online connection to the wireless mobile device associated with the vehicle of the another AVPPL community member seeking to park along the road.

2. The automatic-vacant-parking-place locator of claim 1, wherein the location analyzer comprises a global positioning system (GPS) receiver.

3. The automatic-vacant-parking-place locator of claim 1, wherein at least some modules of the processor are associated with the server.

4. The automatic-vacant-parking-place locator of claim 1, wherein at least some modules of the processor are comprised in the wireless mobile devices.

5. The automatic-vacant-parking-place locator of claim 1, wherein at least some of the images obtained by the camera of at least one of the wireless mobile devices are video images.

6. The automatic-vacant-parking-place locator of claim 1, wherein the information obtained by the processor additionally comprises at least one of: a determination of parking rules on the detected and located vacant parking place, the velocity of the vehicle, the time a located vacant parking place has been detected and a time passed from the time the vacant parking place was detected and located.

7. The automatic-vacant-parking-place locator of claim 1, wherein the processor is further configured to determine of parking rules on the detected located vacant parking place by obtaining data from a city council.

8. The automatic-vacant-parking-place locator of claim 1, wherein the processor is configured to detect and locate the vacant parking place size according to at least one of number of pixels or reference to objects with known size near the detected and located vacant parking place.

9. The automatic-vacant-parking-place locator of claim 1, wherein the processed information is displayed on a display of the wireless mobile device associated with the vehicle of the another AVPPL community member seeking to park along said road.

10. The automatic-vacant-parking-place locator of claim 1, wherein the processed information is utilized to route and guide the another AVPPL community member toward a located vacant parking place in a required area.

11. An automatic-vacant-parking-place locating (AVPPL) method comprising:
receiving by a processor one or more camera images of at least one side of a road from one or more wireless mobile devices associated with vehicles passing along the road and location data from corresponding location analyzers, wherein the vehicles are AVPPL community members' vehicles and wherein each of the mobile devices comprises a camera, a location analyzer and an online connection to a server, each of the wireless mobile devices is associated with one of the vehicles and placed in the associated vehicle so that the camera can capture at least one side of a road the vehicle passes along, the location analyzer is configured to detect location data about the associated vehicle;

detecting and locating, by the processor, a vacant parking place along the road, for another AVPPL community member seeking to park along said road by:
processing the obtained images and location data into processed information;
providing, based on the obtained images and location data, additional processed information comprising the location of the vacant parking place; and,
determining a size of the located vacant parking place so as to be a suitable parking place for multiple vehicles of AVPPL community members, the size determination including a determination of the length of the located vacant parking place, the size determination included in the processed information; and,
obtaining, by a mutual database associated with the server, the processed information from the processor and providing, by the mutual database, from the processed information, the location of the vacant parking place via the online connection to the wireless mobile device associated with the vehicle of the another AVPPL community member seeking to park along the road.

12. The method of claim 11, wherein the location analyzer comprises a global positioning system (GPS) receiver.

13. The method of claim 11, wherein at least some of the processor operations are performed in the server.

14. The method of claim 11, wherein at least some of the processor operations are performed in the wireless mobile devices.

15. The method of claim 11, wherein at least some of the images obtained by the camera of at least one of the wireless mobile devices are video images.

16. The method of claim 11, wherein the information obtained by the processor additionally comprises at least one of: a determination of parking rules on the detected located vacant parking place, the velocity of the vehicle, the time a located vacant parking place has been detected and a time passed from the time the vacant parking place was detected and located.

17. The method of claim 11, further comprising determining of parking rules on the detected located vacant parking place by obtaining data from a city council.

18. The method of claim 11, further comprising detecting and locating the vacant parking place size according to at least one of number of pixels or reference to objects with known size near the detected and located vacant parking place.

19. The method of claim 11, further comprising displaying the processed information on a display of the wireless mobile device associated with the vehicle of the another AVPPL community member seeking to park along the road.

20. The method of claim 11, further comprising utilizing the processed information to route and guide the another AVPPL community member toward a located vacant parking place in a required area.

21. The automatic-vacant-parking-place locator of claim 1, wherein the processor configured for determining the size of the located vacant parking place, includes analyzing whether the vacant parking place is actually a parking place based on the determined size.

22. The method of claim 11, wherein providing processed information comprising the size determination of the located vacant parking place includes analyzing whether the located vacant parking place is actually a parking place based on the size determination.

23. A parking-place locator system comprising:
a processor programmed to receive: 1) one or more camera images from at least one wireless mobile device of at least one first user, of at least one side of a road that a vehicle associated with the at least one wireless mobile device passes along; and, 2) location data from location analyzers of the wireless mobile device; and, to detect and locate a vacant parking place along the road by processing the received images and the location data, and to provide, based on the processed images and the location data, processed information comprising the detecting and locating of the vacant parking place along the road, and determining the size of the located vacant parking place so as to be a suitable parking place for multiple vehicles, the size including the length of the located vacant parking place, the size determination included in the processed information; and, storage media in electronic communication with the at least one processor, the storage media including at least one mutual database associated with the at least one processor and configured to obtain the processed information from the processor and to provide the location of the vacant parking place, obtained from the processed information, via an online connection, to a wireless mobile device associated with at least one second user seeking to park along the road.

24. A method for locating vacant parking places comprising:

receiving, by a processor: 1) one or more camera images of at least one side of a road from at least one wireless mobile device of at least one first user associated with a vehicle passing along the road, and, 2) location data from corresponding location analyzers of the at least one mobile device;

detecting and locating, by the processor, a vacant parking place along the road by processing the received images and location data;

providing, based on the processed images and the location data, processed information comprising a size of the located vacant parking place so as to be a suitable parking place for multiple vehicles, the size including the length of the located vacant parking place; and, obtaining, by a mutual database associated with a server, via an online connection, the processed information and the location data from the processor, and the location of the vacant parking place; and a processor associated with the server causing sending the location of the vacant parking place, via an online connection, to a wireless mobile device associated with at least one second user seeking to park along the road.

* * * * *